(12) United States Patent
Olague et al.

(10) Patent No.: US 10,152,315 B1
(45) Date of Patent: Dec. 11, 2018

(54) LIVE RULE DEPLOYMENT WITH DEPLOYMENT LOG

(71) Applicants: Craig Alan Olague, Moorpark, CA (US); Ross H. Mills, Carmarillo, CA (US); Gautam Saggar, Burbank, CA (US); Nikolas Terani, Woodland Hills, CA (US); William Quach, Woodland Hills, CA (US)

(72) Inventors: Craig Alan Olague, Moorpark, CA (US); Ross H. Mills, Carmarillo, CA (US); Gautam Saggar, Burbank, CA (US); Nikolas Terani, Woodland Hills, CA (US); William Quach, Woodland Hills, CA (US)

(73) Assignee: Intuit Inc., Mountain View, CA (US)

( * ) Notice: Subject to any disclaimer, the term of this patent is extended or adjusted under 35 U.S.C. 154(b) by 62 days.

(21) Appl. No.: 15/221,553

(22) Filed: Jul. 27, 2016

(51) Int. Cl.
*G06F 9/44* (2018.01)
*G06F 8/65* (2018.01)
*H04L 29/08* (2006.01)

(52) U.S. Cl.
CPC .............. *G06F 8/65* (2013.01); *H04L 67/02* (2013.01); *H04L 67/34* (2013.01)

(58) Field of Classification Search
USPC ....................................................... 717/171
See application file for complete search history.

(56) References Cited

U.S. PATENT DOCUMENTS

| | | | |
|---|---|---|---|
| 7,747,730 B1* | 6/2010 | Harlow | H04L 41/048 709/202 |
| 2003/0026404 A1* | 2/2003 | Joyce | G06Q 20/00 379/144.01 |
| 2007/0156659 A1* | 7/2007 | Lim | G06F 21/6227 |
| 2010/0061294 A1* | 3/2010 | Proctor, Jr. | H04W 4/029 370/328 |

(Continued)

OTHER PUBLICATIONS

Smpyrakis, G., "Automatic Deployment Rules", published on May 7, 2012, in ConfigMgr 2012, https://blogs.technet.microsoft.com/.../configmgr-2012-automatic-deployment-rules/ (23 pages).

(Continued)

*Primary Examiner* — Chameli Das
(74) *Attorney, Agent, or Firm* — Ferguson Braswell Fraser Kubasta PC

(57) ABSTRACT

The invention relates to a method for live rule deployment with a deployment log. The method includes executing rules of a first rules package in response to one or more requests from applications. Also, the method includes receiving an identifier. The identifier is received from a configuration service, and the identifier identifies a location from which a latest rules package can be obtained. The method further includes determining, using the identifier, that a new rules package is available for deployment. Still yet, the method includes, in response to determining that the new rules package is available, requesting, using the location, a second rules package from a rules package manager. Further, the method includes receiving the second rules package from the rules package manager, and replacing the first rules package with the second rules package by deploying the second rules package.

14 Claims, 8 Drawing Sheets

(56) References Cited

U.S. PATENT DOCUMENTS

| | | | |
|---|---|---|---|
| 2010/0095330 A1* | 4/2010 | Pal | H01M 10/465 |
| | | | 725/68 |
| 2013/0086627 A1* | 4/2013 | Bryan | H04L 63/10 |
| | | | 726/1 |
| 2014/0019617 A1* | 1/2014 | Hadar | G06F 9/45558 |
| | | | 709/225 |
| 2014/0106699 A1* | 4/2014 | Chitre | H04W 76/007 |
| | | | 455/404.1 |
| 2014/0136607 A1* | 5/2014 | Ou | H04L 67/18 |
| | | | 709/203 |
| 2016/0055104 A1* | 2/2016 | Huang | G06F 13/10 |
| | | | 710/8 |
| 2016/0247151 A1* | 8/2016 | Gupta | G06Q 20/085 |
| 2016/0315971 A1* | 10/2016 | Lim | G06F 21/6218 |
| 2016/0344738 A1* | 11/2016 | Dotan | H04L 63/101 |
| 2017/0004486 A1* | 1/2017 | Dhala | G06Q 20/3224 |
| 2017/0262821 A1* | 9/2017 | Imrey | G06Q 20/02 |
| 2018/0082277 A1* | 3/2018 | Sagan | G06Q 20/227 |

OTHER PUBLICATIONS

Serre, Romain, "Software Update with SCCM Part 3—Automatic Deployment Rules" published on Mar. 8, 2014, in www.tech-coffee.net/software-update-sccm-part-3-automatic-deployment-rules/ (11 pages).

* cited by examiner

DEPLOYMENTS

Environment: production ▽ — 252

DEPLOYMENT DETAILS | RULES PACKAGE DETAILS

| ID | STATUS | COMMENT | DATE/ TIME | BY | PKG ID | RULES PACKAGE NOTES |
|---|---|---|---|---|---|---|
| 241 | SUCCESS | First attempt at production | 2016-01-02 5:58 PM | user 1 | 5 | First attempt to deploy to production |
| 401 | SUCCESS | IDE changes | 2016-01-03 6:10 PM | user 2 | 41 | Validation demonstration |
| 421 | SUCCESS | Roll back due to IDE changes | 2016-01-03 6:44 PM | user 1 | 61 | Validation test |
| 496 | SUCCESS | CC Scoring update | 2016-01-09 7:33 AM | user 1 | 82 | New release of risk rule flow |
| 842 | SUCCESS | Updated return value | 2016-01-11 8:21 AM | user 3 | 101 | Fixed end of risk rule flow |
| 905 | SUCCESS | Updated aggregate calc. | 2016-01-13 11:39 AM | user 2 | 121 | Current production package |

LIVE RULE DEPLOYMENT WITH DEPLOYMENT LOG

BACKGROUND

A rules engine enables a business to create and adjust various policies or rules that take effect under specific circumstances. Traditionally, developers or engineers populate a table or database with the data that the rules are tested against. Only after the table or database has been populated, are rule writers able to author the rules that leverage the data within. Due to development cycles that developers and engineers operate under, it may take days, weeks, months, or even longer, for the developers or engineers to populate the table or database with the data for the rules. During this time, the rule writers are unable to author or test new rules, because the data remains inaccessible. Such rules may be necessary for combatting fraud or identifying suspicious network activity. In addition, the deployment of new rules in such systems can be a protracted sequence of events—requiring the involvement of developers and engineers to manually compile and deploy the rules to targeted servers.

SUMMARY

In general, in one aspect, the invention relates to a method for live rule deployment with a deployment log. The method includes executing rules of a first rules package in response to one or more requests from applications. Also, the method includes receiving an identifier. The identifier is received from a configuration service, and the identifier identifies a location from which a latest rules package can be obtained. The method further includes determining, using the identifier, that a new rules package is available for deployment. Still yet, the method includes, in response to determining that the new rules package is available, requesting, using the location, a second rules package from a rules package manager. Further, the method includes receiving the second rules package from the rules package manager, and replacing the first rules package with the second rules package by deploying the second rules package.

In general, in one aspect, the invention relates to a system for live rule deployment with a deployment log. The system includes a hardware processor and memory. Also, the system includes software instructions stored in the memory. The software instructions are configured to execute on the hardware processor, and, when executed by the hardware processor, cause the hardware processor to execute rules of a first rules package in response to one or more requests from applications. Also, when executed by the hardware processor, the software instructions cause the hardware processor to receive, from a configuration service, a rules package identifier and a Uniform Resource Locator (URL). The URL identifies a location from which a latest rules package can be obtained. Moreover, when executed by the hardware processor, the software instructions cause the hardware processor to determine, using the rules package identifier, that a new rules package is available for deployment. Further, when executed by the hardware processor, the software instructions cause the hardware processor to, in response to determining that the new rules package is available, request, using the URL, a second rules package from a rules package manager. Still yet, when executed by the hardware processor, the software instructions cause the hardware processor to receive the second rules package from the rules package manager, and replace the first rules package with the second rules package by deploying the second rules package.

In general, in one aspect, the invention relates to a non-transitory computer readable medium for live rule deployment with a deployment log. The non-transitory computer readable medium stores instructions which, when executed by a computer processor, include functionality for executing rules of a first rules package in response to one or more requests from applications. Also, the non-transitory computer readable medium stores instructions which, when executed by the computer processor, include functionality for receiving, from a configuration service, an identifier. The identifier identifies a location from which a latest rules package can be obtained. Further, the non-transitory computer readable medium stores instructions which, when executed by the computer processor, include functionality for determining, using the identifier, that a new rules package is available for deployment. Additionally, the non-transitory computer readable medium stores instructions which, when executed by the computer processor, include functionality for, in response to determining that the new rules package is available, requesting, using the location, a second rules package from a rules package manager. Still yet, the non-transitory computer readable medium stores instructions which, when executed by the computer processor, include functionality for receiving the second rules package from the rules package manager, and replacing the first rules package with the second rules package by deploying the second rules package.

Other aspects and advantages of the invention will be apparent from the following description and the appended claims.

BRIEF DESCRIPTION OF DRAWINGS

FIGS. 2A and 2B illustrate interfaces for interacting with systems in accordance with one or more embodiments of the invention.

DETAILED DESCRIPTION

Figure 1A:
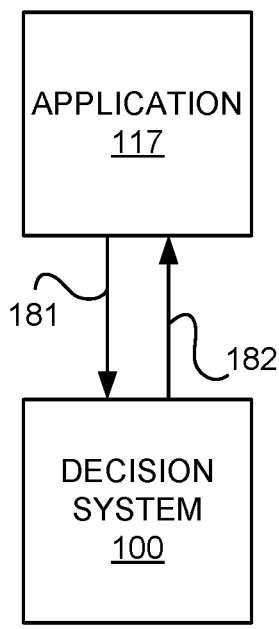
FIGS. 1A, 1B, and 1C illustrate systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system and method for live rule deployment with a deployment log. As described below, rule writers are provided with a simple tool that initiates the deployment of a rules package at a rules engine without requiring the assistance of engineers and developers. A rules package is automatically updated when a new rules package is made available. Via the methods and systems described herein, rules package deployment proceeds in a manner that requires minimal user interaction. Rules package deployment may be tracked for auditing and roll back purposes, for ensuring that problematic deployments can be identified and rectified.

In one or more embodiments, each of the rules package manager, the rules engine, and the configuration service, may operate as web services on corresponding servers. Accordingly, the rules package manager, the rules engine, and the configuration service may leverage an application program interface (API) that uses web-based requests, such as a RESTful API, to transfer information and data therebetween.

FIG. 1A depicts a schematic block diagram of a decision system (100) for performing live rule deployment with a deployment log, in accordance with one or more embodiments of the invention. In one or more embodiments of the invention, one or more of the elements shown in FIG. 1A may be omitted, repeated, and/or substituted. Accordingly, embodiments of the invention should not be considered limited to the specific arrangements of modules shown in FIG. 1A.

In one or more embodiments, the decision system (100) is configured to receive a request (181) from an application (117), and, in response to the request (181), transmit a response (182) that includes a decision based on the information included in the request (181).

In one or more embodiments, the application (117) may include any device or process that utilizes decision logic of a rules engine within the decision system (100). In one or more embodiments, the application (117) may be operative to initiate transactions, such as sales, returns, or transfers of money. For example, the application (117) may include a credit card authorization application executing on a web server, point-of-sale software installed on a point-of-sale device at a store, a payments application executing on a mobile phone, software that initiates ACH or wire transfers, etc. Accordingly, the request (181) may include information about a relevant transaction. For example, the request (181) may include an account name, account number, routing number, merchant identifier, dollar value, etc.

Still yet, as discussed below, the decision system (100) is operative to receive the request (181), and utilize one or more rules to arrive at a decision that is included in the response (182). The process of arriving the decision may require data that is not readily accessible to the rules. The data may include data of a production computing environment. Accordingly, the decision system (100) may utilize mappings to dynamically obtain the data necessary to provide the response (182) to the application (117).

Figure 1B:
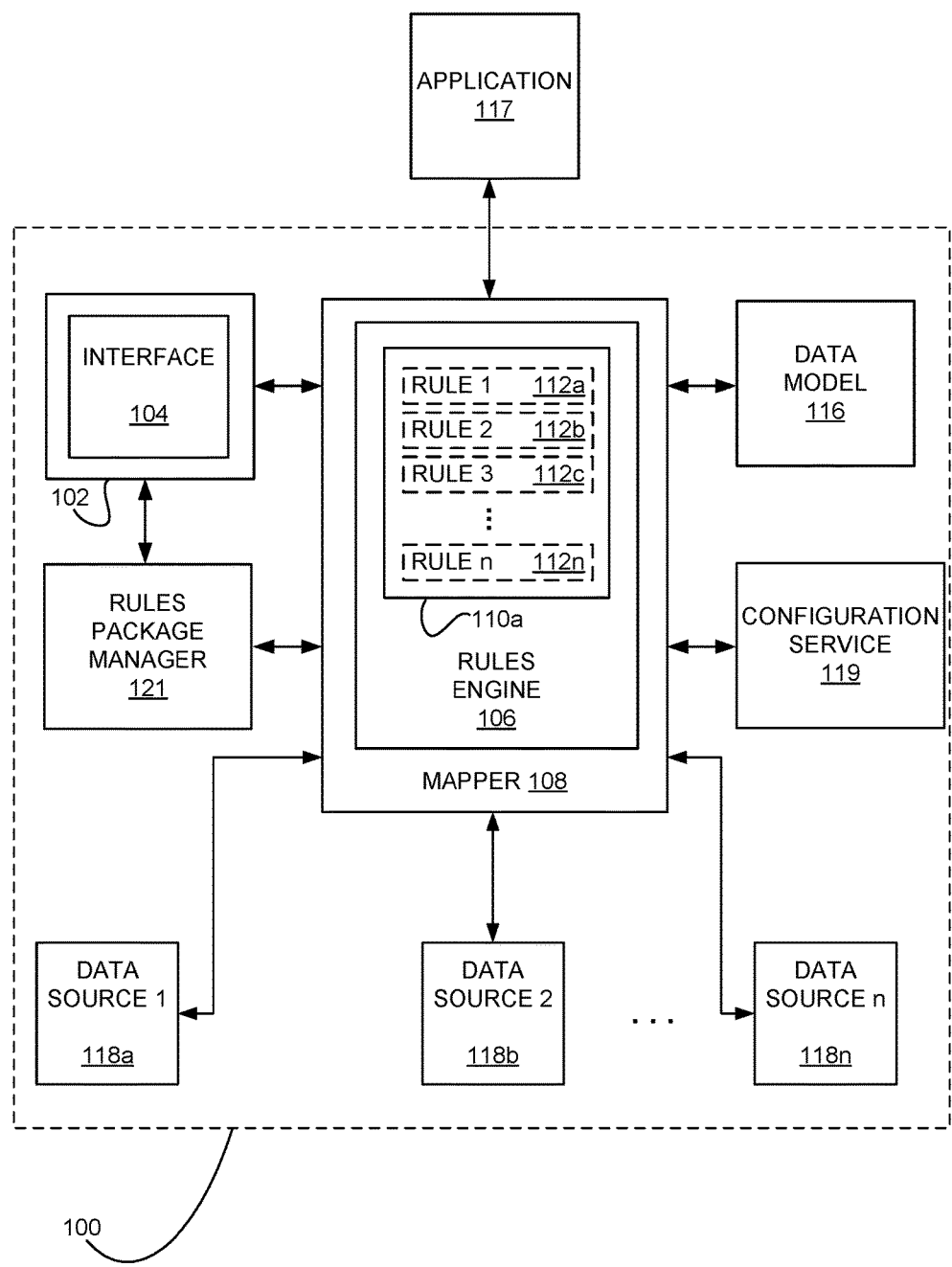

FIG. 1B depicts a schematic block diagram of the decision system (100) for performing live rule deployment with a deployment log, in accordance with one or more embodiments of the invention. In one or more embodiments of the invention, one or more of the elements shown in FIG. 1B may be omitted, repeated, and/or substituted. Accordingly, embodiments of the invention should not be considered limited to the specific arrangements of modules shown in FIG. 1B.

As illustrated in FIG. 1B, the system (100) includes a client (102), a mapper (108) wrapped around a rules engine (106), a data model (116), a rules package manager (121), a configuration service (119), and numerous data sources (118). Further, the rules engine (106) is shown to include a currently deployed rules package (110a), and the currently deployed rules package (110a) includes numerous rules (112). Each of these is discussed, in turn, below.

In one or more embodiments, one or more of the rules engine (106), the data model (116), the client (102), the application (117), the rules package manager (121), the configuration service (119), and the data sources (118) may reside on separate physical computing systems that communicate via one or more computer networks. As non-limiting examples, the computer network(s) may include wired and/or wireless portions of public and/or private data networks, such as wide area networks (WANs), local area networks (LANs), the Internet, etc.

As described herein, the rules engine (106) includes a software component that executes the rules (112) of the currently deployed rules package (110a) during runtime in a production environment. The rules engine (106) may determine when, and in which order, the rules (112) are executed. In this way, the rules engine (106) may describe a sequence of operations that are necessary to evaluate a particular rule (112). A rules engine (106) may be used by business domain experts to create decision logic for the decision system (100) that is based on ever-changing regulations and policies. As used herein, a policy includes a course or method of action that has been selected to guide a business by determining, for the business, the results of current and future decisions.

For example, the rules engine (106) may include, based on business policies, rules (112) regarding pecuniary payments. More specifically, the rules engine (106) may include rules (112) that are used to identify payments that evidence suspicious commercial activity. The rules (112) may be modified over time to augment the identification of suspicious activity by the rules engine (106). For example, as described below, the rules (112) may configured to respond to payments over a threshold value, a number of transactions within a time period exceeding a threshold number, a number of payment disputes within a time period exceeding a threshold number, a number of returns within a time period exceeding a threshold number, etc. Moreover, any of such thresholds may be modified over time to improve the fraud detection capabilities of the rules engine (106).

A rules package (110) is a single file or object that includes a plurality of rules (112) for concurrent deployment at the rules engine (106). In other words, a plurality of rules (112) may be bundled into the currently deployed rules package (110a) for simultaneous deployment of all the rules (112) contained therein, such that any of the rules (112) within may be executed by the rules engine (106), as necessary. As described herein, the currently deployed rules package (110a) may be replaced during runtime by another rules package (110) that contains a different set of rules, thereby changing the rules being executed by, and therefore the underlying logic of, the rules engine (106).

Moreover, each of the rules (112a-112n) includes computer-formatted instructions that determine, when executed by the rules engine (106), an output in response to one or more specific conditions. The output may include an action. One or more of the rules (112) may be configured to return a Boolean value, such as a value of TRUE or FALSE. One or more of the rules (112) may be configured to return a numerical value, such as an integer, decimal, etc. A rule (112) may reflect a policy or practice of a business organization. In this way, the rule (112) may define or limit some aspect of business activity. For example, a given rule (112) may be configured to reject credit card authorizations above a certain value, where the certain value may be a static number, or may be based on historical values for a particular merchant. More specifically, the rule (112) may be configured to reject credit card authorizations for a merchant when the credit card authorization includes a value that exceeds 4× the average transaction value, for the past 30 days, for the merchant.

In one or more embodiments, one or more of the rules (112) may be expressed as if-then logic, a decision table, a decision tree, etc. By altering the contents of the rules (112), use of the rules (112) may enable a business to define, test, execute, and change business logic in the system (100), thereby enabling the management and adjustment of business processes. For example, the currently deployed rules package (110a) may be replaced by another rules package (110) in response to changing policies, laws, trends, etc.

A given rule (112) may be written based on corporate policies or practices. For example, a rule (112) may be written to prevent a merchant account from processing certain types of transactions within 30 days of opening the merchant account. Also, a given rule (112) may be based on regulations, laws, or other legal requirements. For example, a rule (112) may be written to process credit card refunds in a manner that complies with state or federal regulations. Further, a given rule (112) may be based on an analysis of historical data of a business. For example, a rule (112) may be written based on recently observed trends that tend to indicate fraudulent activity.

In this way, the rules (112) may ensure the compliance of a business with governmental bodies, as well as ensure the business, moving forward, adheres to best practices as determined from its own historical data. Because the rules (112) are maintained separately from the logic of the rules engine (106), and other applications (117) executing in the environment of the system (100), the rules (112) may be frequently updated to reflect changing business and regulatory conditions, without altering or changing the core applications or systems, such as the rules engine (106), data sources (118), payment processing systems (not shown), etc.

In one or more embodiments, a rule flow defines two or more of the rules (112) that may be evaluated for a given business process, policy, or decision. The rules (112) of a rule flow may be evaluated sequentially and/or in parallel. For example, two rules (112) may be evaluated in parallel, and the results of the evaluations compared. Moreover, one or more of the rules (112) of a rule flow may depend on the output of another rule. For example, the output of a first one of the rules (112) may be provided as input to a second one of the rules (112).

In one or more embodiments, a rules package (110) may include entry points. Each entry point may receive a specific set of inputs or parameters to start a rule flow. For example, a given entry point may receive as input a merchant identifier and date range, and the rule flow associated with the entry point may utilize the merchant identifier and date range to obtain various data values when executing the rules within. In this way, a decision from the rule flow may be based on data associated with the particular merchant and from the particular date range.

In one or more embodiments, a rules package (110) may include endpoints. Each endpoint, when called, may return mapping information for a particular rule or rule flow. As an option, a rules package (110) may include a single endpoint that returns all mappings of the rules (112) contained therein.

For purposes of simplicity and clarity, the currently deployed rules package (110a) of FIG. 1B is shown to include four rules (112a, 112b, 112c, 112n), but it is understood a rules package (110) may include hundreds, thousands, hundreds of thousands, or more rules (112).

As illustrated by FIG. 1B, the rules engine (106) and/or mapper (108) is in communication with a configuration service (119). As described herein the configuration service (119) includes a centralized service that maintains configuration information for the rules engine (106). In particular, the configuration service (119) manages the deployment rules packages (110) to the rules engine (106). Moreover, the configuration service (119) may manage the deployment of the rules packages (110) to the rules engine (106) and one or more other rules engines (not shown). This mechanism is further described in the context of FIG. 1C.

The rules package manager (121) includes logic for tracking and initiating the deployment of rules packages (110) to the rules engine (106). Also, the rules package manager (121) is operative to serve rules packages (110) to the rules engine (106) upon a request from the rules engine (106). This mechanism is further described in the context of FIG. 1C. As an option, the rules package manager (121) may include endpoints that are used to determine the health of the rules package manager (121), such as, for example, in the event of a disaster or other adverse event.

As illustrated in FIG. 1B, the rules engine (106) is wrapped by a mapper (108). By wrapping the rules engine (106) with the mapper (108), the mapper (108) may be able to initiate communications (i.e., requests, responses, calls, messages, etc.) sent from the rules engine (106), as well as communications sent to the rules engine (106). It is contemplated, however, that in one or more embodiments the logic of the mapper (108) and the rules engine (106) may be integrated such that both are located in a single codebase. In other words, in one or more embodiments, the rules engine (106) may include the logic of the mapper (108), and utilize mappings to obtain data during rule execution or otherwise upon request, such as during testing.

In one or more embodiments, the mapper (108) may call the currently deployed rules package (110a) to obtain any mappings contained therein. For example, the currently deployed rules package (110a) may include numerous rules (112), some or all of which include mappings that have been configured by rule writers. In one or more embodiments, the mapping may be retrieved using endpoints of the currently deployed rules package (110a). After obtaining the mappings, the mapper (108) may store the mappings to memory. Subsequently, as a rule (112) is executed by the rules engine (106), the rule (112) may make a request or call for data. The data may be required for evaluating the contents of the rule (112).

As used herein, the data requested by a rule (112) may include any text, numerical value, Boolean value, etc. returned by a data source (118) in response to a request from the mapper (108). Accordingly, the data may be included in a response to a request from the mapper (108). The data and the response may be communicated over a computer network, system bus, or any other communication bus. In one or more embodiments, the data may include transaction data only, merchant data only, or a combination of transaction data and merchant data. For example, the data may include a number of checks written, cashed, processed, and/or received. As another example, the data may include a total value of sales for a period of time (e.g., per hour, per day, per week, per month, etc.), and/or a total number of transactions for a period of time (e.g., per hour, per day, per week, per month, etc.). Still yet, as an example, the data may include a score, such as a credit score, fraud score, etc., and/or a code, such as an error code or rejection code. As another example, the data may include a number of and/or value of returns for a period of time (e.g., per hour, per day, per week, per month, etc.). As yet another example, the data may include an account number or other unique identifier, such as an Internet Protocol (IP) address of a device.

The mapper (108) may use one or more stored mappings to identify a data source (118) from which the data requested by the rule (112) may be obtained. For example, the identified data source (118) may store the data requested by the rule (112), or be operative to generate the data requested by the rule (112). Moreover, after identifying the data source (118) from which the data may be obtained, the mapper (108) may issue a request for the data to the data source (118).

In one or more embodiments a request from the mapper (108) includes any call or message sent to a data source (118) that results in the return of data, in a response, from the data source (118) that received the request. The structure, format, and contents of the request may depend on the data being requested, and/or the data source (118) to which the request is sent. In one or more embodiments, a request may include a stored procedure call, an Application Program Interface (API) call, a web service call, a database query, etc.

Thus, as used herein, a data source (118) includes any device or service that returns data in response to a request or call from the mapper (108). In one or more embodiments, a data source (118) may include a database, such as a relational database, a flat, hierarchical database, or other data storage mechanisms. For example, the data source (118) may include a Cassandra database, a Hadoop database, a Titan database, an Oracle® database, a SQL server database, or MySQL database. Thus, in such embodiments, a request to the data source (118) may include a query. In one or more embodiments, a data source (118) may include a web service. For example, the data source (118) may include an Internet-based application, from which data can be retrieved via Hypertext Transfer Protocol (HTTP) requests. Thus, in such embodiments, the request to the data source (118) may include, for example, an HTTP GET request. In one or more embodiments, a data source (118) may include a stored remote procedure. Accordingly, in such embodiments, the request to the data source (118) may include a remote procedure call.

Of course, two or more different types of data sources (118) may be concurrently accessible to the mapper (108). For example, as illustrated by FIG. 1B, a first data source (118a) may include a remote procedure responsive to remote procedure calls from the mapper (108), a second data source (118b) may include a database responsive to queries from the mapper (108), and a third data source (118n) may include a web service responsive to requests via a public API. In one or more embodiments, a payroll service, transaction clearinghouse, or financial management platform, such as Intuit® QuickBooks Online®, may be used as a data source (118) that returns data for use by one or more of the rules (112). During execution or testing of a rule (112) or rule flow, the mapper (108) may request and obtain information from any number of the data sources (118).

In one or more embodiments, the data sources (118) may return any type of data in response to a request. For example, a given data source (118) may return an indication of whether a bank account identified in a request is valid, and/or the type of the account that is identified in the request from the mapper (108). As another example, a given data source (118) may return an indication of whether a bank account routing number is valid, and/or if a particular transaction, as identified in a request from the mapper (108), can be processed against the bank. As yet another example, a given data source (118) may return the maximum value of a transaction that may be processed against a bank account and/or bank identified in a request from the mapper (108).

In one or more embodiments, a data source (118) may generate and return one or more aggregate values. For example, one of the data sources (118) may include a distributed database, such as the Cassandra database, that applies aggregation functions to stored data as a part of a query result. Accordingly, data returned from such a data source (118) may include a computed aggregate value, such as a sum, count, average, minimum, maximum, etc. of numerous transactions. The aggregate value may be computed by querying multiple tables, and then combining the results to arrive at the aggregate value. As one example, an aggregate value may include a total value of all sales transactions across different payment methods for a specific account for a defined time period.

Still referring to FIG. 1B, as used in the system (100), the data model (116) stores data returned from the data sources (118). In one or more embodiments, the data model (116) may include a plurality of property and value pairs. In one or more embodiments, the property-value pairings of the data model (116) may include all the data that might be required by the rules (112) of the currently deployed rules package (110a). In one or more embodiments, the property-value pairings of the data model (116) may not include all the data that might be required by the rules (112) of the currently deployed rules package (110a). Upon determining that the data model (116) is without the data required by a given rule (112), and during rule execution, the mapper (108) may utilize a mapping from the given rule (112) to request the data, as required by the rule (112), from a data source (118).

As described below, the interface (104) includes a user interface through which a rule writer may view a log of deployments of various rules packages (110), as well as view a listing of rules packages (110) that are available for deployment. Moreover, using the interface (104), a rule writer may deploy a selected rules package (110) to the rules engine (106). The interface (104) may include any type and any number of user interface elements arranged to facilitate the viewing of the log and the listing, and deployment of rules packages (110). For example, the interface (104) may include text entry fields, drop-down menus, check boxes, radio buttons, etc. As used herein, a rule writer is any user, such as, for example, a human operator, that writes, configures, or modifies rules (112) that are executed within the system (100).

Additionally, as described herein, the client (102) includes any computing device capable of displaying the interface (104). For example, the client (102) may include a desktop computer, portable computer (e.g., laptop, netbook, etc.), or mobile device (e.g., tablet computer, cellular phone, smartphone, etc.), etc., that is used to display the interface (104). In one or more embodiments, the interface (104) may include the user interface of an application executing locally on the client (102). In one or more embodiments, the interface (104) may be provided over a network for presentation to a rule writer at the client (102). For example, the interface (104) may include a web page, such that the viewing of the log of deployments, and the listing of rules packages (110), is in a web-browser based interface. Similarly, within the web-browser based interface, commands to distribute or deploy rules packages (110) may be received from a rule writer, and provided to the rules package manager (121).

In one or more embodiments, the client (102) may include a development environment. The development environment may allow for the authorship, modification, and testing of rules (112) on the client (102). As an option, the interface (104) may include functionality for downloading rules (112) and/or rules packages (110) from the rules package manager (121). After downloading rules (112) and/or rules packages (110) to the client (102), a rules writer may compile and test rules (112) at the client (102), and subsequently upload rules (112) and/or rules packages (110) to the rules package manager (121).

Still yet, the application (117) may include any device or process that utilizes the decision logic of the rules engine (106). In one or more embodiments, the application (117) may utilize the rules engine (106) for making decisions during transaction processing. For example, the application (117) may perform credit card or debit card authorization in response to communications from point-of-sale devices. Accordingly, the application (117) may rely on execution of the rules (112) of the rules engine (106) for determining whether to approve or deny a credit card based on some combination of the user of the card, an account attached to the card, a merchant account associated with the application (117), the point-of-sale device from which the authorization was received, etc.

Figure 1C:
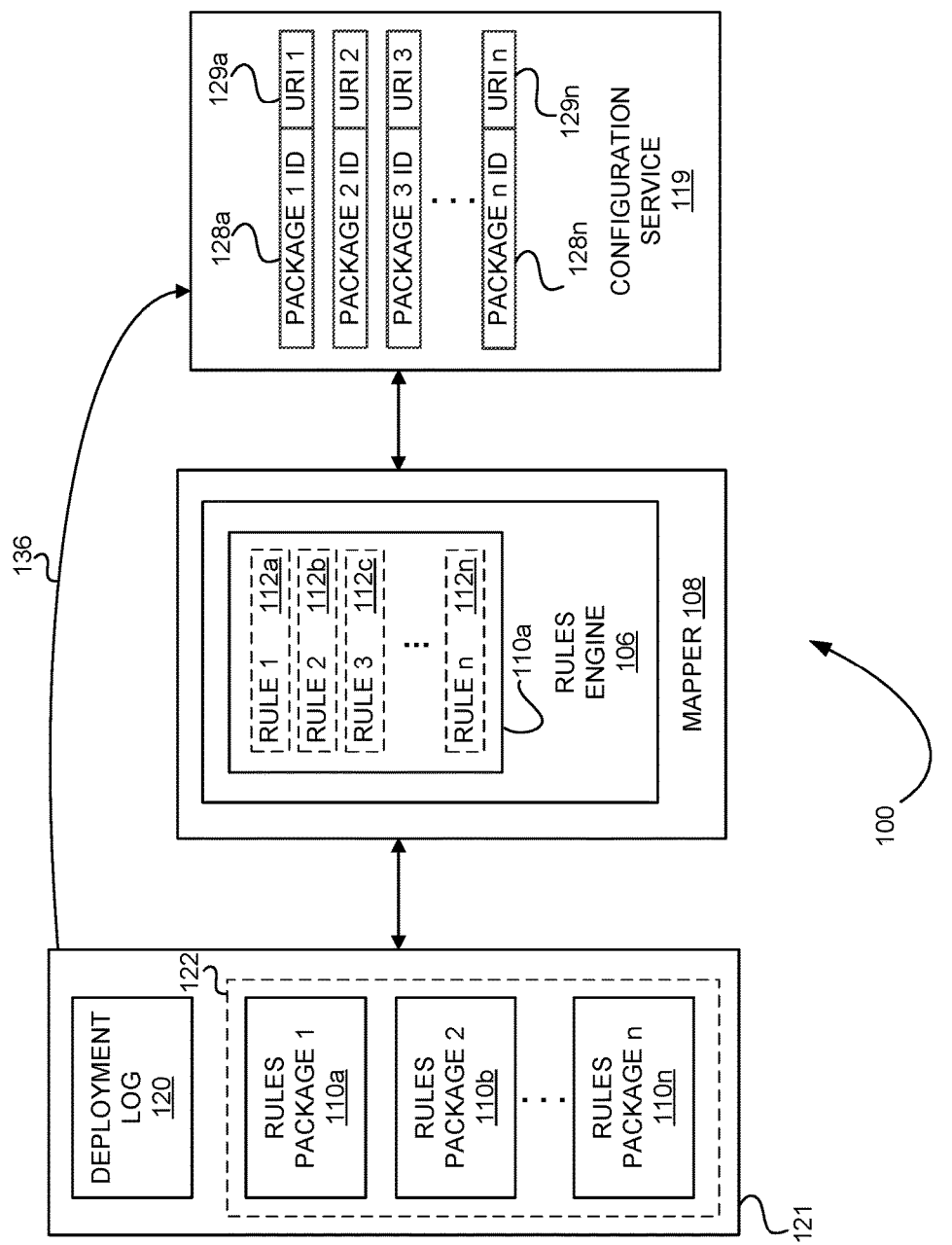

FIG. 1C depicts another view of the system (100) for live rule deployment with a deployment log, in accordance with one or more embodiments of the invention. In one or more embodiments of the invention, one or more of the elements shown in FIG. 1C may be omitted, repeated, and/or substituted. Accordingly, embodiments of the invention should not be considered limited to the specific arrangements of modules shown in FIG. 1C.

As shown in FIG. 1C, the rules package manager (121) stores multiples rules packages (110). For example, the rules package manager (121) is shown to store a copy of the rules package (110a) currently deployed at the rules engine (106). Also, the rules package manager (121) is shown to store one or more additional rules packages (110b-110n). Accordingly, in one or more embodiments, the rules package manager (121) includes a repository (122) of rules packages (110). The repository (222) may include any type of storage unit and/or device (e.g., a file system, database, collection of tables, or any other storage mechanism) for storing data. Further, the repository (122) may include multiple different storage units and/or devices. The multiple different storage units and/or devices may or may not be of the same type or located at the same physical site. As an option, the repository (122) may include a vertical data warehouse. Accordingly, the repository (122) may include a database to which all previously and currently deployed rules packages (110) are persisted.

As described herein, a rules package (110) may be compressed. Still yet, in one or more embodiments, a rules package (110) may be a binary file. For example, a rules package (110) may include a FICO® Blaze Advisor® (ADB) file.

The additional rules packages (110b-110n) may include a previously deployed rules package (110b) that was replaced in the rules engine (106) by the deployment of the currently deployed rules package (110a). Also, the additional rules package (110b-110n) may include a rules package (110n) that is currently under test. For example, after the rules package under test (110n) has been determined to be fit for deployment in a production environment, the rules package under test (110n) may be deployed to the rules engine (106), via mechanisms described below, thereby replacing the currently deployed rules package (110a) at the rules engine (106).

In other words, the rules packages (110a-110n) stored in the repository (122) of the rules package manager (121) may include a copy of the currently deployed rules package (110a), as well as rules packages (110) that were previously deployed within the decision system (100), and rules packages that have been compiled but not deployed to the rules engine (106).

For purposes of simplicity and clarity, the rules package manager (121) of FIG. 1C is illustrated store three rules packages (110a, 110b, 110n), however it us understood that the rules package manager (121) may store hundreds, thousands, hundreds of thousands, or more rules packages (110).

In one or more embodiments, the rules package manager (121) may send a message (136) to the configuration service (119) to notify the configuration service (119) of the availability of a new rules package (110). For example, the rules package manager (121) may provide the configuration service (119) with a package identifier (128) for a rules package (110), and a uniform resource identifier (129) from where the rules package (110) may be downloaded. The package identifier (128) may identify domains and/or environments to which the rules package (110) may be deployed. Using this information, the configuration service (119) may track which version of a rules package (110) is currently active for a rules engine (106).

Generally, the configuration service (119) may provide a uniform resource identifier (URI) (128) to the rules engine (106), and the rules engine (106) may utilize the uniform resource identifier (128) from the configuration service (119) to download and deploy a rules package (110) from the rules package manager (121). Accordingly, in one or more embodiments, the rules package manager (121) may serve a rules package (110) to the rules engine (106) in response to a request from the rules engine (106).

Also, the rules package manager (121) includes a deployment log (120). The deployment log (120) may record each deployment of a rules package (110) to the rules engine (106). In this way, the deployment log (120) may keep a record of past rules package deployments for security audit and bug tracking purposes. Accordingly, whenever a rules package (110) is deployed at the rules engine (106), the deployment log (120) may be updated to reflect a record of the deployment. For example, the deployment log (120) may be updated to include a time and date of the deployment, a user that initiated the deployment, whether the deployment was determined to be successful, and/or a note as to why the deployment was initiated.

Still referring to FIG. 1C, the configuration service (119) is illustrated to store multiple package identifiers (128), where each package identifier (128) is stored in association with a URI (129). Each of the URIs (129*a*-129*n*) may be unique. Accordingly, each URI (129) may include a location from which a different rules package (110) may be downloaded. In this way, multiple rules packages (110) may be available for download and by a rules engine (106) deployment at any given time.

The configuration service (119) includes logic for determining which URI (129) is provided to the rules engine (106). In one or more embodiments, each package identifier (128) may include information used to identify an associated rules package (110). For example, a package identifier (128) may include a name of a rules package (110), a version of a rules package (110), a unique ID of a rules package (110), etc. In one or more embodiments, each package identifier (128) may identify a domain or an environment to which the identified rules package (110) should be deployed. For example, a package identifier (128) may indicate that the associated rules package (110) should be deployed to a test environment, a staging environment, or a production environment. As another example, a package identifier (128) may indicate that the associated rules package (110) should be deployed to only a first domain or network.

More specifically, for example, a first rules package identifier (128*a*) may be associated with a first rules package (110*a*), and indicate that the first rules package (110*a*) is to be deployed to a production environment; and a second rules package identifier (128*n*) may be associated with a second rules package (110*n*), and indicate that the second rules package (110*n*) is to be deployed to a test environment. Each of the package identifiers (128*a*, 128*n*), and the associated URIs (129*a*, 129*n*) may be stored in the configuration service (119) based on a corresponding unique message (136) from the rules package manager (121). Accordingly, if the rules engine (106) sends a request to the configuration service (119) requesting information on a current rules package (110), and the request indicates that the rules engine (106) is in a production environment, then the configuration service (119) may provide a first URI (129*a*) associated with the first rules package identifier (128*a*) to the rules engine (106). Similarly, if the rules engine (106) sends a request to the configuration service (119) requesting information on a current rules package (110), and the request indicates that the rules engine (106) is in a test environment, then the configuration service (119) may provide a second URI (129*n*) associated with the second rules package identifier (128*n*) to the rules engine (106).

In one or more embodiments, the configuration service (119) may determine the domain or environment that the rules engine (106) is a member of without the rules engine (106) explicitly providing this information to the configuration service (119). For example, the configuration service (119) may rely on an address, hostname, or other identifier of the rules engine (106) to determine its domain or environment. In this way, the configuration service (119) may be simultaneously used by multiple environments and domains to deploy rules packages (110) as appropriate. Moreover, different rules package (110) may be simultaneously deployed to each of the domains or environments.

In one or more embodiments, the rules engine (106) may include a caching mechanism that is used to determine whether or not the currently deployed rules package (110*a*) is current, or if instead the currently deployed rules package (110*a*) should be replaced.

In one or more embodiments, the rules engine (106) periodically checks with the configuration service (119) to determine whether the currently deployed rules package (110*a*) is current for the rules engine (106), or if instead the currently deployed rules package (110*a*) should be replaced. For example, the rules engine (106) may call the configuration service (119) multiple times a minute, hour, day, etc. (e.g., every 30 seconds, 60 second, 15 minutes, etc.). The call may include, for example, a web services request. Moreover, the call may include an identification of the rules engine (106). In response to the call, the configuration service (119) may provide a package identifier (128) and/or URI (129) of a rules package (110) that should be presently deployed to the rules engine (106). If the package identifier (128) and/or URI (129) received from the configuration service (119) identifies a rules package (110) other than the currently deployed rules package (110*a*), the rules engine (106) may attempt to download the rules package (110) from the rules package manager (121), at the URI (129) received from the configuration service (119).

In one or more embodiments, the configuration service (119) may include a distributed configuration service. For example, the configuration service (119) may include Apache ZooKeeper™.

In one or more embodiments, after a given rules package (110) has been deployed to the rules engine (106), the rules package manager (121) may prevent the removal of the rules package (110) from the repository (122). For example, if the currently deployed rules package (110*a*) is replaced by another rules package (110*n*) on the rules engine (106), the rules package manager (121) may prevent deletion of the rules package (110*a*) from the repository (122). In this way, the previously deployed rules package (110*a*) may remain available for re-deployment or testing purposes. For example, the previously deployed rules package (110*a*) may be subsequently deployed to a testing environment for diagnosing problems in the previously deployed rules package (110*a*).

Figure 2A:
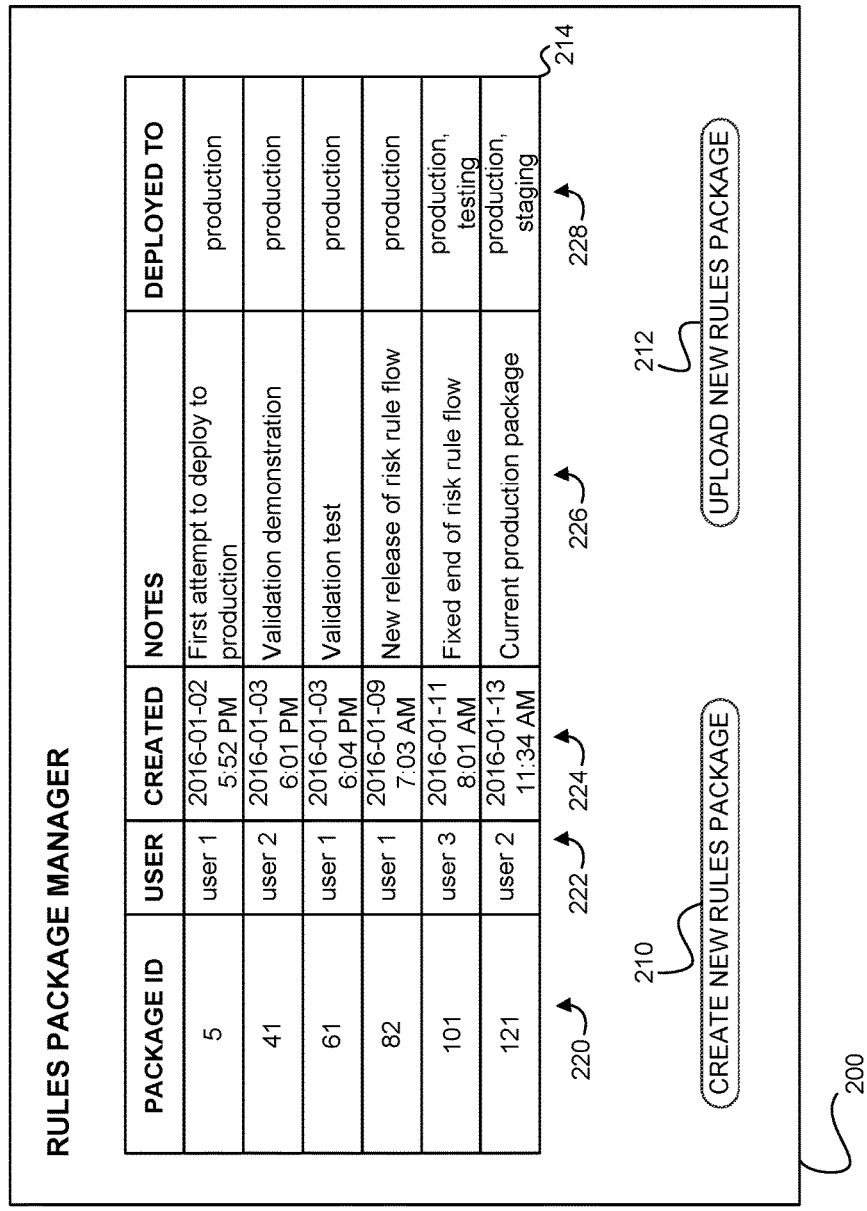

FIG. 2A illustrates an interface (200) for managing rules packages, in accordance with one or more embodiments of the invention. In one or more embodiments of the invention, one or more of the elements shown in FIG. 2A may be omitted, repeated, and/or substituted. Accordingly, embodiments of the invention should not be considered limited to the specific arrangements of elements shown in FIG. 2A.

In one or more embodiments, the interface (200) of FIG. 2A may be substantially identical to the interface (104) described in the context of FIG. 1B. In other words, the interface (200) of FIG. 2A may be used by a rule writer, via a client (e.g., the client (102)) to view rules packages stored at a rules package manager. In particular, the interface (200) allows a rule writer to view the status of rules packages stored at the rules package manager. Furthermore, the interface (200) may enable rule writers to add new rules packages to the rules package manager.

More specifically, as illustrated in FIG. 2A, the interface (200) includes a listing (214) of rules packages that are stored at the rules package manager. For each rules package stored at the rules package manager, the listing (214) may include various informational elements. For example, as illustrated in FIG. 2A, the listing (214) includes a package identifier (i.e., "package ID") (220) for each package stored at the rules package manager. Each package may be attributed a unique identifier for facilitating the management and deployment of packages in a decision system. Also, as illustrated in FIG. 2A, the listing (214) identifies a user (222) that created each package stored at the rules package manager, as well as a date and time of creation (224). User identifiers (222), as well as dates and times (224), may be used for auditing and bug tracking purposes. Further, as illustrated in FIG. 2A, the listing (214) includes notes (226) for each package stored at the rules package manager. Notes for a rules package may be created by the user that created the rules package. For example, the user that created the rules package may indicate, in the notes, why the rules package was created, why it was deployed, and/or issues that may exist within the rules package. Still yet, as illustrated in FIG. 2A, the listing (214) identifies an environment (228) to which each of the rules package is deployed. Because a rules package manager may host packages for multiple domains or environments, it may be useful to know the domains or environments that each package is being used in. This may be important, for example, for tracking bugs present in some domains or environments, but not others.

The interface (200) of FIG. 2A is also shown to include a button (210) for creating a new rules package. Upon activation of the button (210), a rule writer may be able to create a new rules package on the rules package manager. Creating a new rules package may include authoring rules and rule flows, testing rules and rule flows, and compiling a rules package. Still yet, the interface (200) of FIG. 2A is shown to include a button (212) for uploading a rules package to the rules package manager. Upon activation of the button (212), a rule writer may be able to upload a rules package that he or she has authored and compiled on his or her local computer, such as, for example, the client (102) of FIG. 1B. In one or more embodiments, security policies may exist to prevent the uploading and deployment of rules packages by unauthorized users. For example, based on a security policy, a particular rule writer may be able to create a new rules package and upload a new rules package, as shown in interface (200), but be prevented from activating the rules packages for deployment to rules engines.

FIG. 2B illustrates an interface (250) for viewing a log of rules package deployments, in accordance with one or more embodiments of the invention. In one or more embodiments of the invention, one or more of the elements shown in FIG. 2B may be omitted, repeated, and/or substituted. Accordingly, embodiments of the invention should not be considered limited to the specific arrangements of elements shown in FIG. 2B.

In one or more embodiments, the interface (250) of FIG. 2B may be substantially identical to the interface (104) described in the context of FIG. 1B. In other words, the interface (250) of FIG. 2B may be used by a rule writer, via a client (e.g., the client (102)) to view rules package deployments. In particular, the interface (250) allows a rule writer to view deployments to a particular environment, as well as various details for each of the deployments.

As illustrated in FIG. 2B, the interface (250) includes a listing (264) of rules packages that have been deployed to a selected environment (252). In particular, via a drop-down menu, the selected environment (252) is identified as a production environment. Accordingly, the listing (264) has been populated to identify past and present rule package deployments to the production environment. Moreover, for each rules package deployed to the production environment, the listing (264) may include various informational elements.

For example, as illustrated in FIG. 2B, the listing (264) includes a deployment identifier (i.e., "ID") (270) for each deployment that has occurred in the production environment. Each deployment of a rules package may be attributed a unique deployment identifier for facilitating the management of, and identifying problems within, a decision system.

Also, as illustrated in FIG. 2B, the listing (264) identifies a status (272) of each rules package deployment within the production environment. Not all rules package deployments may complete successfully. For example, when a rules package is distributed for deployed, it may be deployed to both a primary datacenter, as well as one or more backup datacenters. The backup datacenters may be relied on, for example, in the event of disaster recovery. In some circumstances, it may be possible for a rules package to deploy successfully to the primary data center, but fail to deploy to a backup datacenter. In such circumstances, the status (272) of the deployment may indicate that the rules package has not been deployed to the backup data center. Using this information, a rule writer may, at a later point in time, be reminded to initiate deployment of the rules package to the backup datacenter.

Further, as illustrated in FIG. 2B, the listing (264) includes a comment (274) for each rules package deployment. Each of the comments may be created by a user that initiated the corresponding deployment. Moreover, each of the comments may indicate why the user deployed the rules package, such as, for example, to fix an issue present in the previously deployed rules package, or to test a new feature.

Also, as illustrated in FIG. 2B, the listing (264) includes a user identifier (278) for a user that initiated the deployment of the rules package, as well a date/time (276) of the deployment. The user identifiers (278), as well as dates and times (276), may be used for auditing and bug tracking purposes.

Still yet, the listing (264) includes, for each of the rules package deployments, information regarding the deployed rules package. For example, as shown in the listing (264), each of the deployment records identifies information previously presented in the context of the listing (214) of the interface (200) of FIG. 2A. Specifically, the listing (264) includes the package identifier (220) for each of the deployed rules packages, as well as the notes (226) for each of the deployed rules packages. In this way, using the interface (250), a rule writer may be able to quickly ascertain why a rules package was deployed, as well as why that particular rules package may have been created.

Figure 3:
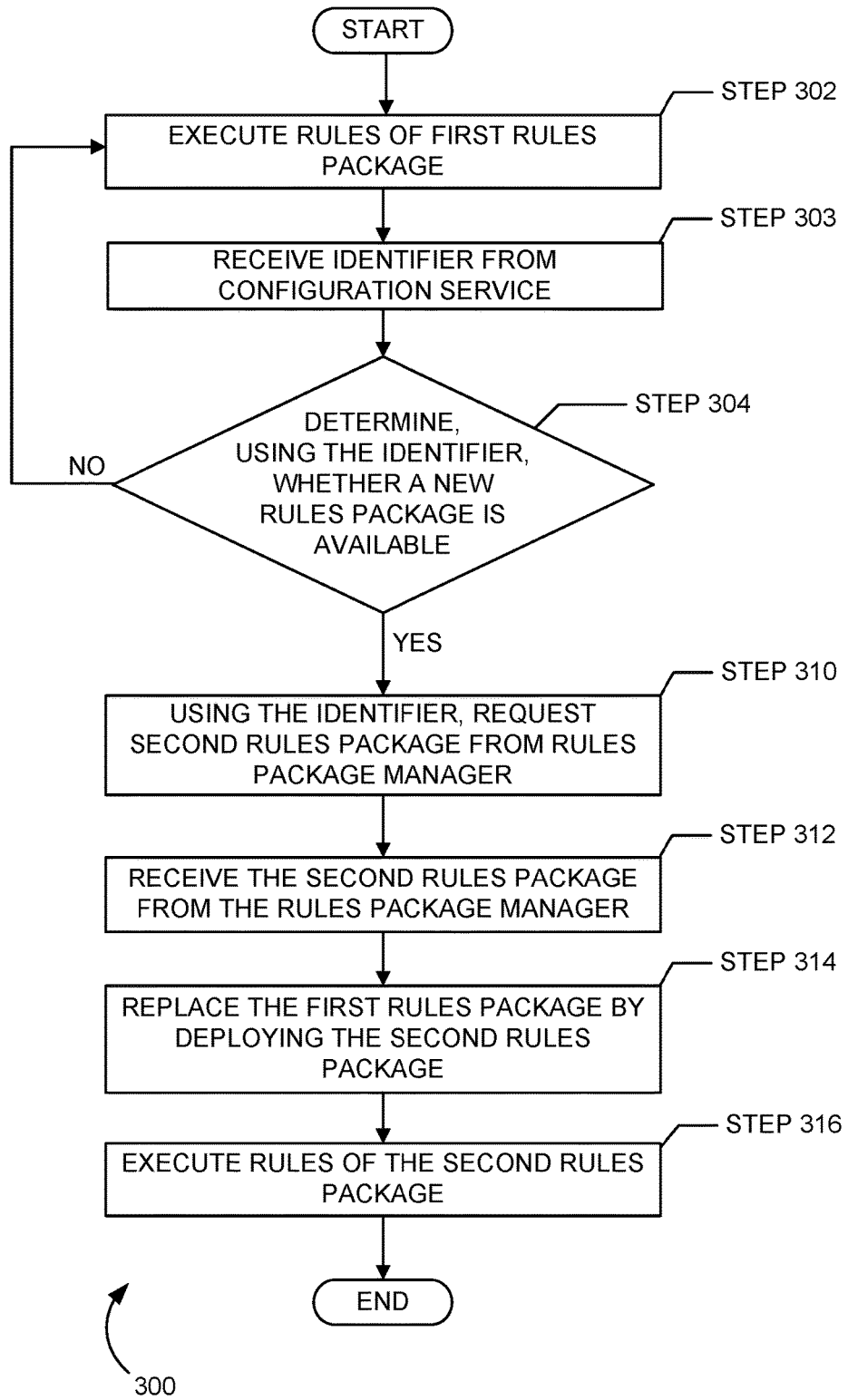
FIG. 3 illustrates a method performed in accordance with one or more embodiments of the invention.

FIG. 3 depicts a flowchart of a method (300) for live rule deployment with a deployment log, in accordance with one or more embodiments of the invention. In one or more embodiments, one or more of the steps shown in FIG. 3 may be omitted, repeated, and/or performed in a different order. Accordingly, embodiments of the invention should not be considered limited to the specific arrangements of steps shown in FIG. 3. In one or more embodiments, the method (300) described in reference to FIG. 3 may be practiced using the rules engine (106) and or mapper (108) of the system (100) of FIG. 1A, 1B, or 1C, the interfaces (200, 250) of FIGS. 2A and 2B, and/or the computing system (500) of FIG. 5A.

At Step 302, rules of a first rules package are executed. In one or more embodiments, rule execution may include providing decisions in response to requests from applications. For example, an application may rely on the execution of the rules, by a rules engine, for determining whether to approve or deny a credit card based on some combination of the user of the card, an account attached to the card, a merchant account associated with the application, the point-of-sale device from which the authorization was received, etc.

In one or more embodiments, execution of the rules may include executing one or more rule flows. Moreover, execution of the rules may include retrieving data from data sources that is required for execution of the rules. The data may be retrieved using mappings. Each of the mappings may include a request for data, and identify a data source to which the request is sent. For example, each of the mappings may include a query to a database, a call to a web service, or a call to a stored procedure. Accordingly, for each of the mappings, a request may be sent to a data source. In response to each request, a corresponding response may be received. The response may include data required by a rule for the rule execution. During the rule execution of Step 302, the received data may be evaluated according to rules of the first rules package.

At Step 303, an identifier is received from a configuration service. In one or more embodiments, the rules engine may periodically make a call to the configuration service. For example, the rules engine may make a call to the configuration service after so many seconds, minutes, hours, etc., have passed since the last call to the configuration service. In one or more embodiments, the call to the configuration service may identify a domain or environment that the rules engine is part of. For example, the call may identify that the rules engine is part of a production, testing, or staging environment.

In one or more environments, the configuration service may identify a domain or environment of the rules engine based on identifying information of the rules engine that is received with the call. For example, the call may identify the rules engine using a unique identifier. The configuration service may utilize the unique identifier of the rules engine to determine the rules package that should be deployed to the rules engine. For example, the configuration service may utilize the unique identifier of the rules engine to look-up the domain or environment of the rules engine. Moreover, based on the domain or environment of the rules engine, the configuration service may return an identifier of a particular rules package.

Thus, in response to a call from the rules engine, the configuration service may utilize the identification of the domain or environment to return a package identifier and/or URI to the rules engine. Accordingly, the identifier received from the configuration service may be received from the configuration service in response to a call from the rules engine.

At Step 304, it is determined, using the identifier, whether a new rules package has been distributed.

In one or more embodiments, the rules engine may compare an identifier of the rules package currently deployed on the rules engine with the identifier returned to the rules engine from the configuration service. For example, the rules engine may compare the package identifier and/or URI of the rules package currently deployed and executing on the rules engine with the package identifier and/or URI of the rules package returned to the rules engine. More specifically, for example, the rules engine may compare a version of the rules package currently deployed and executing on the rules engine with a version of the rules package returned to the rules engine. If the rules engine determines that the identifier of the rules package currently deployed on the rules engine is the same as the identifier of the rules package returned from the configuration service, then the rules engine may determine that a new rules package has not been distributed. In other words, if the rules package currently deployed to the rules engine is the most up to date rules package for the rules engine, as indicated by the configuration service, then the rules engine continues to execute the rules of the currently deployed rules package. Accordingly, if, at Step 304, it is determined that a new rules package has not been distributed, then the rules engine continues to execute the rules of the first rules package.

In one or more embodiments, a new rules package may be distributed when a rule writer indicates that the rules package should be deployed to a particular environment. For example, the rule writer may indicate within an interface that the rules package should be deployed to a production environment. Moreover, in response to the rules package being selected for deployment, a rules package manager may notify the configuration service that the new rules package is available. In one or more embodiments, the rules package selected for deployment may be a rules package that was previously deployed to the environment. For example, if the currently deployed rules package is not executing as expected, the rule writer may be able to quickly and effectually initiate a roll back to a prior version of a rules package. Of course, the rules package selected for deployment may be a new rules package recently uploaded or created by the rule writer.

However, if, at Step 304, it is determined that a new rules package has been distributed, then the rules engine requests, at Step 310 and using the identifier, the new rules package from the rules package manager. In one or more embodiments, the rules engine may determine that a new rules package has been distributed based on a determination that the identifier of the rules package currently deployed on the rules engine is different from the identifier of the rules package returned from the configuration service. In one or more embodiments, the rules package manager may include a web services interface, and the request to the rules package manager may include a request to the web services interface, such as, for example an HTTP GET request, or other REST request. Moreover, the request to the rules package manager may be directed to a location included with the identifier. Accordingly, each rules package stored by the rules package manager may be associated with a unique address.

In one or more embodiments, the identifier of the second rules package identifies a location at the rules package manager from which the second rules package can be obtained. For example, the identifier may include a URL, and may include, as an option, an IP address, domain, port, protocol, path, web service, etc. from which the second rules package may be obtained at the rules package manager.

Still yet, at Step 312, the rules engine receives the second rules package from the rules package manager. In other words, in response to the rules engine accessing the location at the rules package manager that was provided to the rules engine from the configuration service, the rules package manager provides the second rules package to the rules engine.

Also, at Step 314, the second rules package is deployed at the rules engine. Deploying the second rules package may include loading the second rules package into memory at a machine hosting the rules engine. As a result of the deployment of the second rules package at the rules engine, the first rules package is replaced by the second rules package. Moreover, the replacement of the first rules packaged by the second rules package may occur without restarting any systems, or requiring the involvement of software engineers and developers. Accordingly, further execution of rules by the rules engine, at Step 316, results in the rules of the second rules package being executed against the requests and data received from various applications and data sources.

Figure 4:
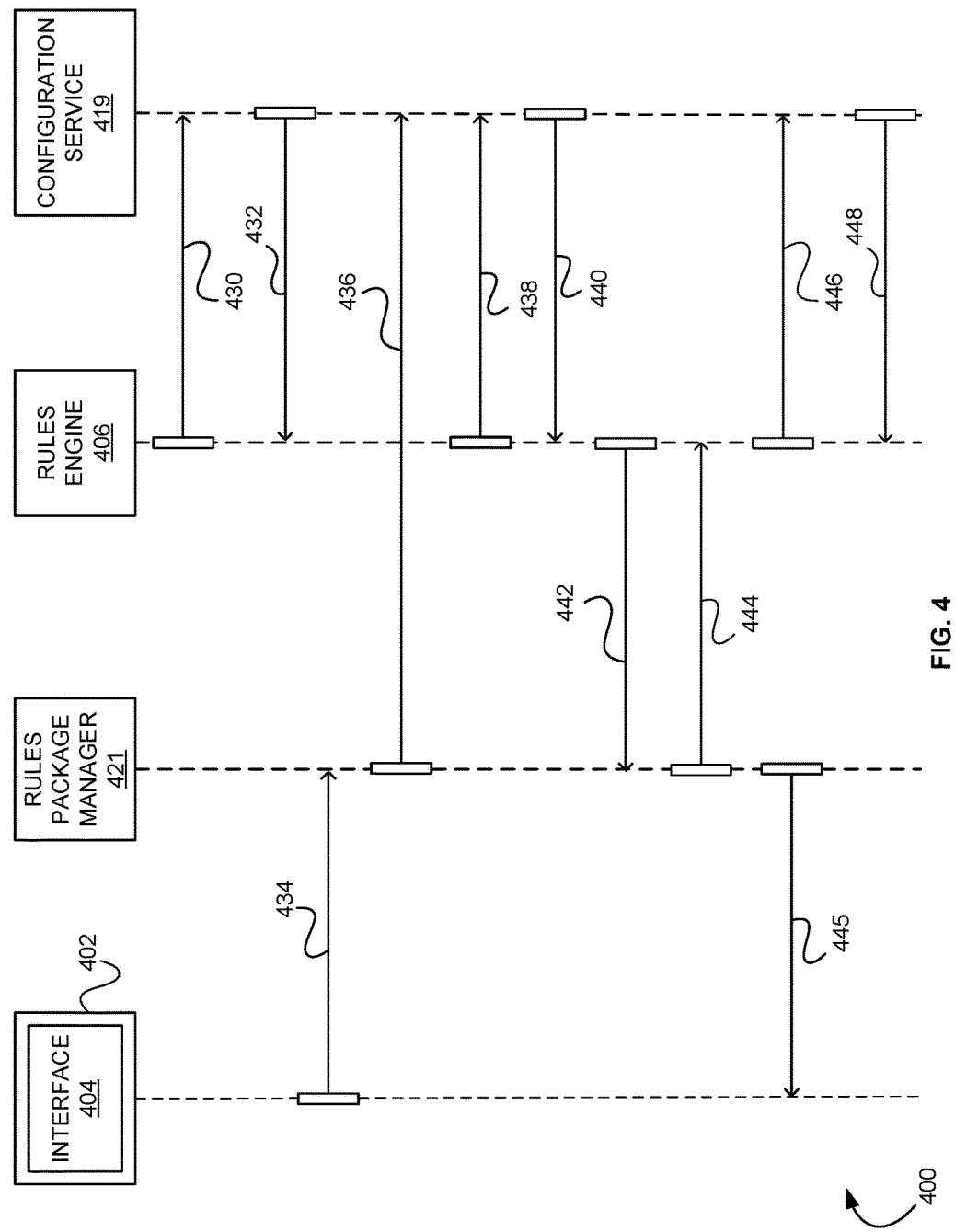
FIG. 4 is a communication flow illustrating live rule deployment with a deployment log, in accordance with one or more embodiments of the invention.

Referring now to FIG. 4, a communication flow (400) illustrates an example of live rule deployment with a deployment log, in accordance with one or more embodiments of the invention. The communication flow (400) may be practiced using the system (100) of FIGS. 1A-1C, in the context of the interfaces (200, 250) of FIGS. 2A and 2B, using computing system (500) of FIG. 5A, and may be based on the method (300) described with respect to FIG. 3, above.

As shown in FIG. 4, the communication flow (400) illustrates the communications between a client (402), rules package manager (421), a rules engine (406), and a configuration service (419), in accordance with one or more embodiments of the invention. The client (402) is shown to include an interface (404), via which a rule writer may instruct the deployment of rules packages to the rules engine (406). The client (402) may be substantially identical to the client (102) described in the context of the system (100) of FIG. 1B. Similarly, the rules package manager (421), the rules engine (406), and the configuration service (419) may be substantially identical to the rules package manager (121), the rules engine (106), and the configuration service (119), respectively, described within the context of the system (100) of FIGS. 1B and 1C. Still yet, the interface (404) may be substantially identical to either of the interfaces (200, 250) described in the context of FIGS. 2A and 2B.

During operation of the rules engine (406), the rules engine (406) makes a call (430) to the configuration service (419). The call (430) may be sent to the configuration service (419) as part of a periodic check by the rules engine (406), to the configuration service (419), for a new rules package. For example, the rules engine (406) may send the same call (430) to the configuration service (419) once every minute.

In response to the call (430), the configuration service (419) provides a response (432) that includes an identifier. The identifier is the identifier of a rules package. Upon receiving the identifier in the response (432), the rules engine (406) compares the identifier in the response (432) to an identifier of a rules package currently deployed at the rules engine (406). The identifiers may be, for examples, versions of the respective rules packages, URLs for obtaining the respective rules packages, etc. Because the identifiers are the same, the rules engine (406) continues to execute the currently deployed rules package against transactional data received from applications.

Via the interface (404) at the client (402), a rule writer has sent a command (434) to initiate the deployment of a new rules package. This may be done, for example, using a web-based interface. As an option, the new rules package may be authored by the rule writer using an integrated development environment executing locally at the client (402), and then uploaded to the rules package manager (421).

In response to the command (434) from the client (402), the rules package manager (421) sends a message (436) to the configuration service (419) informing the configuration service (419) of the new rules package. The message (436) may identify an appropriate domain and/or environment for the new rules package based on input received from the rule writer via the interface (404).

Subsequently, the rules engine (406) may make another call (438) to the configuration service (419). The other call (438) may be substantially identical to the call (430), previously made. The other call (438) may be made by the rules engine (406) after 30 seconds, 60 seconds, 5 minutes, etc. have passed since the first call (430). In response to the other call (438), the configuration service (419) provides a response (440). Again, the response (440) includes an identifier. However, because a new rules package has been deployed based on the message (436), and the configuration service (419) has determined that the rules engine (406) is part of the domain or environment for which the new rules package was deployed, the identifier included in the response (440) is different than the identifier included in the response (432). As a result, the identifier in the response (440) identifies the new rules package, which is different than the rules package currently deployed to the rules engine (406).

Upon receiving the identifier in the response (440), the rules engine (406) compares the identifier in the response (440) to the identifier of the rules package currently deployed to the rules engine (406). Because the identifiers are different, the rules engine (406) issues a request (442) to the rules package manager (421). In particular, the request (442) is directed to an address included with the identifier of the response (440). The address is a location where the new rules package may be pulled from the rules package manager (421).

Accordingly, the new rules package is transmitted in a response (444) from the rules package manager (421) to the rules engine (406). Upon receiving the new rules package in the response (444), the rules engine (406) may replace the previously deployed rules package with the new rules package, and begin evaluating data received from applications based on the contents of the new rules package. Still yet, after sending the response (444) to the rules engine (406), the rules package manager (421) sends an update (445) that updates the interface (404) at the client (402). The update (445) reflects changes to a deployment log maintained by the rules package manager (421). In particular, the update (445) may cause the interface (404) to indicate that the new rules package has been successfully deployed to the rules engine (406) of the production environment, as recorded by the deployment log at the rules package manager (421).

Furthermore, the rules engine (406) continues to periodically call (446) the configuration service (419) to determine whether the deployed rules package should be updated. As noted above, a response (448) to the request (446) may include an identifier, which the rules engine (406) uses to determine whether or not the currently deployed package should be replaced.

In one or more embodiments, each of the rules package manager (421), the rules engine (406), and the configuration service (419) may operate as web services on corresponding servers. Accordingly, each of the communications (430-448) may include network-based communications leveraging an API that uses web-based requests to transfer data, such as a RESTful API.

Using the systems and methods set forth above, rule writers are provided with a simple tool to initiate the deployment of rules packages at rules engines without requiring the assistance of engineers and developers. When deployment is initiated, a rules package manager may notify a configuration service that tracks the latest rules packages available for the rules engines. In turn, the configuration service may provide the rules engines with locations from which the latest rules package may be obtained. Accordingly, the rules engines may quickly and automatically deploy new rules packages shortly after the rule writer initiates deployment in a manner that requires minimal user interaction. Still yet, the deployment of rules packages may be tracked for auditing and roll back purposes, thereby ensuring that problematic deployments can be identified and rectified.

Figure 5A:
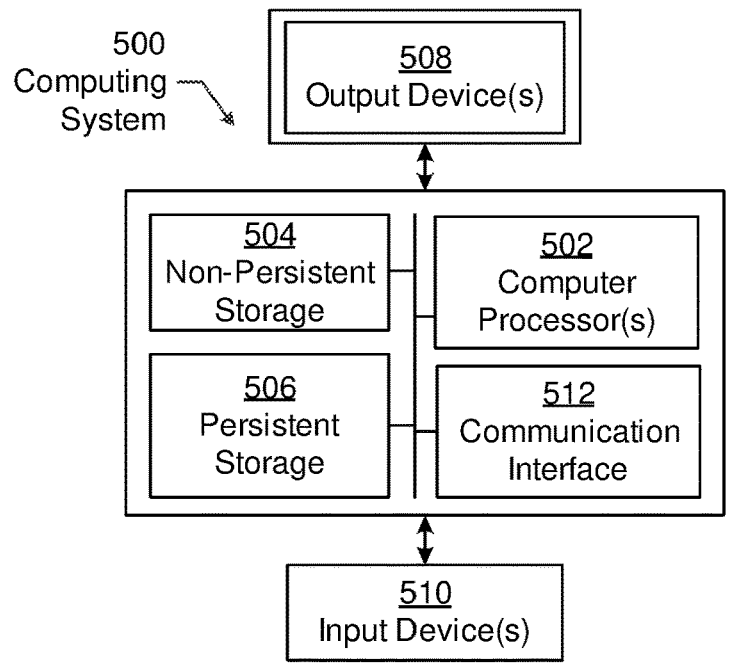
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
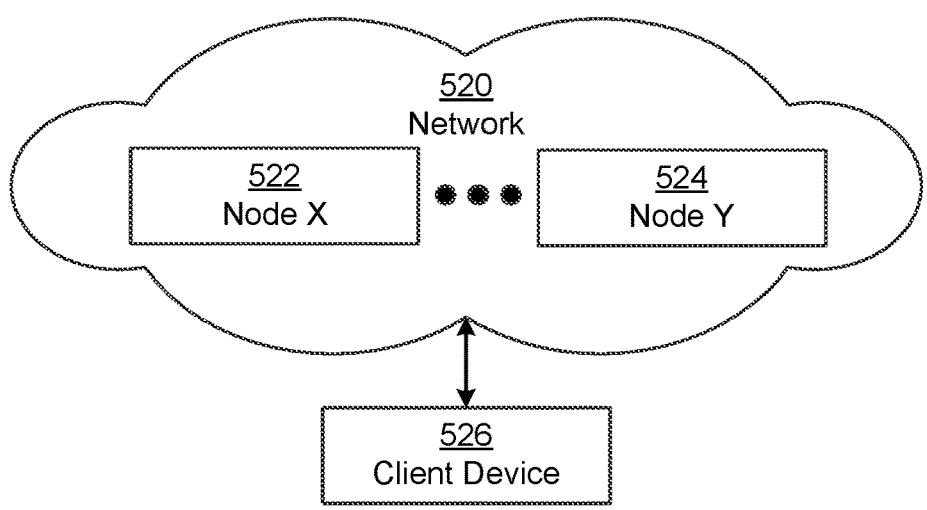
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
   executing rules of a first rules package in response to one or more authorization requests from applications,
      wherein the first rules package is associated with a first identifier, the one or more authorization requests corresponding to at least one financial transaction with a financial card, and
      wherein executing a rule comprises:
         obtaining, by a mapper and from a data source, data identified in an endpoint of the first rules package,
         storing, by the mapper, the data in memory, and
         evaluating, by the rule in the first rules package, whether a corresponding financial transaction is authorized using the data stored in memory;
   receiving, from a configuration service, a second identifier, wherein the second identifier identifies a location from which a latest rules package is obtained;
   comparing the first identifier of the first rules package with the second identifier received from the configuration service to determine that a new rules package is available for deployment;
   in response to determining that the new rules package is available, requesting, using the location, a second rules package from a rules package manager;
   receiving the second rules package from the rules package manager, the second rules package comprising a modification of the rule in the first rules package to augment an identification of suspicious commercial behavior;
   replacing the first rules package with the second rules package by deploying the second rules package; and
   periodically calling the configuration service to determine if the new rules package is available for deployment from the rules package manager.

2. The method of claim 1, further comprising transmitting a call to the configuration service, wherein the second identifier is received from the configuration service in response to the call.

3. The method of claim 1, wherein the second identifier includes a Uniform Resource Locator (URL) that identifies the location.

4. The method of claim 3, wherein the URL includes at least one of an IP address, a domain, a port, a protocol, a path, and a web service from which the second rules package is retrieved at the rules package manager.

5. The method of claim 1, wherein determining that the new rules package is available for deployment includes determining, based on the comparison, that the first identifier of the first rules package is different than the second identifier received from the configuration service.

6. A system, comprising:
   a hardware processor and memory; and
   software instructions stored in the memory and configured to execute on the hardware processor, which, when executed by the hardware processor, cause the hardware processor to:
      execute rules of a first rules package in response to one or more authorization requests from applications,
         wherein the first rules package is associated with a first identifier, the one or more authorization requests corresponding to at least one financial transaction with a financial card, and
         wherein executing a rule comprises:
            obtaining, by a mapper and from a data source, data identified in an endpoint of the first rules package,
            storing, by the mapper, the data in the memory, and
            evaluating, by the rule in the first rules package, whether a corresponding financial transaction is authorized using the data stored in memory;
      receive, from a configuration service, a second identifier, and a Uniform Resource Locator (URL) that identifies a location from which a latest rules package is obtained;
      compare the first identifier of the first rules package with the second identifier received from the configuration service to determine that a new rules package is available for deployment;
      in response to determining that the new rules package is available, request, using the URL, a second rules package from a rules package manager;
      receive the second rules package from the rules package manager, the second rules package comprising a modification of the rule in the first rules package to augment an identification of suspicious commercial behavior;
      replace the first rules package with the second rules package by deploying the second rules package; and
      periodically call the configuration service to determine if the new rules package is available for deployment from the rules package manager.

7. The system of claim 6, further including software instructions stored in the memory and configured to execute on the hardware processor, which, when executed by the hardware processor, cause the hardware processor to transmit a call to the configuration service, wherein the second identifier is received from the configuration service in response to the call.

8. The system of claim 6, wherein the URL includes at least one of an IP address, a domain, a port, a protocol, a path, and a web service from which the second rules package is retrieved at the rules package manager.

9. The system of claim 6, wherein determining that the new rules package is available for deployment includes determining, based on the comparison, that the first identifier of the first rules package is different than the second identifier received from the configuration service.

10. A non-transitory computer readable medium storing instructions, the instructions, when executed by a computer processor, comprising functionality for:
    executing rules of a first rules package in response to one or more authorization requests from applications,
       wherein the first rules package is associated with a first identifier, the one or more authorization requests corresponding to at least one financial transaction with a financial card, and
       wherein executing a rule comprises:
          obtaining, by a mapper and from a data source, data identified in an endpoint of the first rules package,
          storing, by the mapper, the data in memory, and
          evaluating, by the rule in the first rules package, whether a corresponding financial transaction is authorized using the data stored in memory;
    receiving, from a configuration service, a second identifier, wherein the second identifier identifies a location from which a latest rules package is obtained;

comparing the first identifier of the first rules package with the second identifier received from the configuration service to determine that a new rules package is available for deployment;

in response to determining that the new rules package is available, requesting, using the location, a second rules package from a rules package manager;

receiving the second rules package from the rules package manager, the second rules package comprising a modification of the rule in the first rules package to augment an identification of suspicious commercial behavior;

replacing the first rules package with the second rules package by deploying the second rules package; and periodically calling the configuration service to determine if the new rules package is available for deployment from the rules package manager.

11. The non-transitory computer readable medium of claim 10, the instructions, when executed by the computer processor, further comprising functionality for transmitting a call to the configuration service, wherein the second identifier is received from the configuration service in response to the call.

12. The non-transitory computer readable medium of claim 10, wherein the second identifier includes a Uniform Resource Locator (URL) that identifies the location.

13. The non-transitory computer readable medium of claim 12, wherein the URL includes at least one of an IP address, a domain, a port, a protocol, a path, and a web service from which the second rules package is retrieved at the rules package manager.

14. The non-transitory computer readable medium of claim 10, wherein determining that the new rules package is available for deployment includes determining, based on the comparison, that the first identifier of the first rules package is different than the second identifier received from the configuration service.

* * * * *